US008779289B2

(12) United States Patent
Fukuhara

(10) Patent No.: US 8,779,289 B2
(45) Date of Patent: Jul. 15, 2014

(54) ELECTRONIC APPARATUS INCLUDING LID OPENING AND CLOSING MECHANISM

(75) Inventor: Masami Fukuhara, Osaka (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 13/546,127

(22) Filed: Jul. 11, 2012

(65) Prior Publication Data

US 2013/0016482 A1 Jan. 17, 2013

(30) Foreign Application Priority Data

Jul. 15, 2011 (JP) .................................. 2011-156420

(51) Int. Cl.
*H05K 5/03* (2006.01)
(52) U.S. Cl.
USPC .............................. 174/66; 174/67; 361/725
(58) Field of Classification Search
USPC ................. 174/66, 67; 361/725; 220/241, 242
See application file for complete search history.

(56) References Cited

U.S. PATENT DOCUMENTS 6,831,229 B1 * 12/2004 Maatta et al. .................. 174/66

FOREIGN PATENT DOCUMENTS

| JP | 2-79036 | 3/1990 |
| JP | 2-246717 | 10/1990 |
| JP | 10-334981 | 12/1998 |
| JP | 2006-201251 | 8/2006 |

* cited by examiner

*Primary Examiner* — Dhirubhai R Patel
(74) *Attorney, Agent, or Firm* — Panasonic Patent Center

(57) ABSTRACT

A lid opening and closing mechanism includes a casing having an opening, an inner lid provided in the opening, and an outer lid operable to close the opening. The outer lid has a door operable to cover the inner lid, a hinge operable to be bended and unbended to open and close the door. The inner lid has a projection portion that protrudes from a surface of the inner lid. The hinge can move in a direction from the hinge to the door, so that the hinge is accommodated inside the casing when the door is closed, and is pulled outside the casing when the door is opened. When the hinge moves while the state of the door changes from the closed state to the opened state, the hinge goes onto the projection portion to be bended by the projection portion to a direction to outside the casing.

6 Claims, 7 Drawing Sheets

ELECTRONIC APPARATUS INCLUDING LID OPENING AND CLOSING MECHANISM

BACKGROUND

1. Technical Field

The technical field relates to a lid opening and closing mechanism and an electronic apparatus provided with the lid opening and closing mechanism, and, more particular, relates to a hinged-door type lid opening and closing mechanism for use in an electronic apparatus and the like, and an electronic apparatus provided with the lid opening and closing mechanism.

2. Related Art

Many electronic apparatuses such as digital cameras are provided with external terminals such as image output terminals and Universal Serial Bus (USB) terminals to be connected to external apparatuses. In order to protect the external terminals, lids such as terminal covers are provided on outer surfaces of the electronic apparatuses. As a prior art opening and closing mechanism for such lids, there has been known a cover mechanism as described in Japanese Patent Laid-open Publication No. 2006-201251 A. The cover mechanism has such a structure that a hinge is pulled out when a lid is brought into an opened state.

SUMMARY

However, a concern regarding prior art lid opening and closing mechanisms is that the opened state of the lid is not sufficiently maintained unless a user holds the opened state of the lid by fingers or the like. Therefore, there has been such a problem that the user's operation for accessing inside of the lid is complicated, thereby leading to inconvenience. For example, when the user connects a cable to an external terminal inside the lid, the user has to keep maintaining the opened state of the lid with one hand while connecting the cable to the external terminals with the other hand. Such an operation can be a heavy burden for the user.

In view of the problem, as well as other concerns, a lid opening and closing mechanism is provided for maintaining an opened state of a lid more sufficiently.

According to one aspect, there is provided a lid opening and closing mechanism, including a casing having an opening, an inner lid provided in the opening, and an outer lid operable to close the opening. The outer lid has a door operable to cover the inner lid, and a hinge operable to be bended and unbended to open and close the door. The inner lid has a projection portion that protrudes from a surface of the inner lid. The hinge is arranged movably in a direction from the hinge to the door, so that the hinge is accommodated inside the casing in a closed state of the door, and the hinge is pulled outside the casing in an opened state of the door. The projection portion is formed so that, when the hinge moves while the state of the door changes from the closed state to the opened state, the hinge goes onto the projection portion to be bended by the projection portion in a direction outside of the casing.

According to the above aspect, the opened state of a lid is maintained more sufficiently, and therefore, a user can access inside of the lid more easily.

DETAILED DESCRIPTION OF PREFERRED EMBODIMENTS

Embodiments will be described below with reference to the drawings. It should be noted that the embodiments are exemplified by digital cameras.

In the following description, relative to the digital camera of the present embodiment, a direction from the digital camera to a subject is defined as a front direction, and a direction opposite to the front direction is defined as a back direction. A direction from the digital camera to a surface on which a release button (described later) and the like are installed is defined as an up direction, and a direction opposite to the up direction is defined as a down direction. A direction from the digital camera to a surface on which a lid opening and closing mechanism (described later) is installed is defined as a right direction, and a direction opposite to the right direction is defined as a left direction. In addition, a direction from an outer surface of a casing of the digital camera to an inner surface of the casing is defined as an "inward direction", and a direction opposite to the inward direction is defined as an "outward direction".

1. Structure

Figure 1:
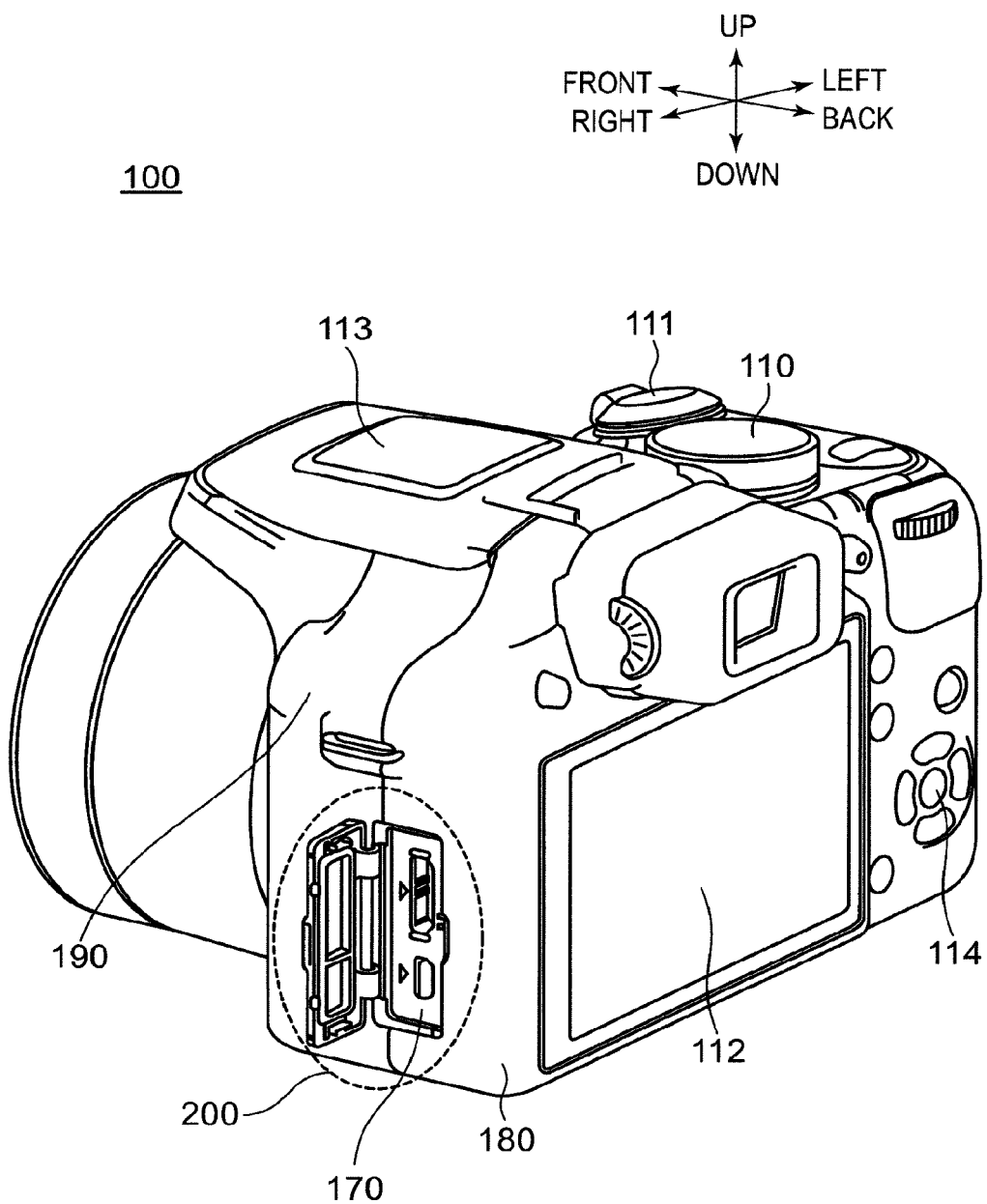
FIG. 1 is an outer appearance view of a digital camera of a present embodiment.

A structure of the digital camera of the present embodiment will be described. As shown in FIG. 1, a digital camera 100 is provided with a lid opening and closing mechanism 200, a liquid crystal monitor 112, an operation button 114, a release button 111, a mode dial 110, a built-in flash 113, and the like on a casing thereof. The casing includes a front case 190 and a rear case 180. In the lid opening and closing mechanism 200 of FIG. 1, an outer lid is opened. In the present embodiment, the lid opening and closing mechanism 200 for a power supply terminal and an HDMI (High-Definition Multimedia Interface) terminal is described, however, the present embodiment is not limited to such a configuration. For example, the present embodiment can be also applied to the lid opening and closing mechanism 200 for a power battery.

Figure 2:
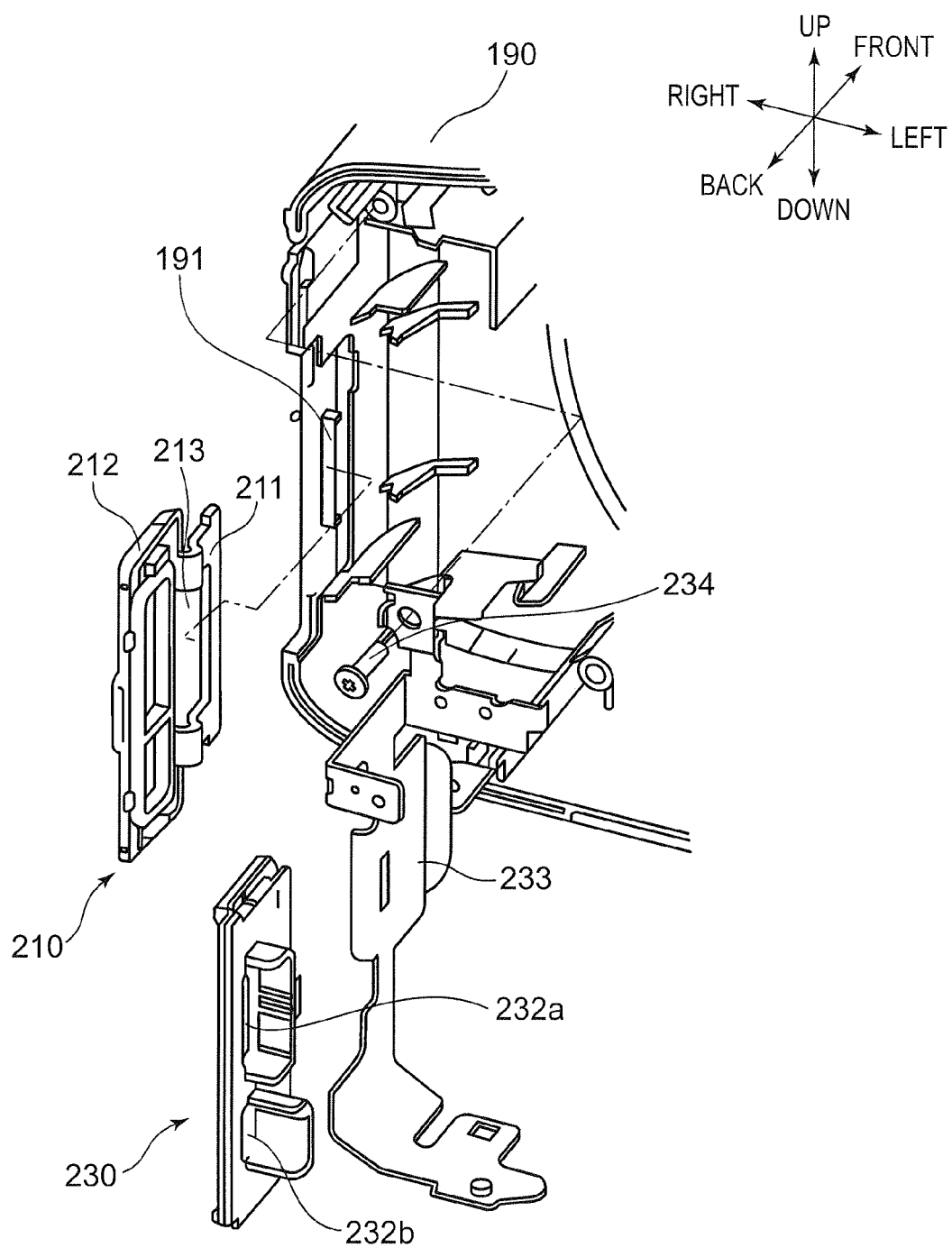
FIG. 2 is an exploded perspective view of a lid opening and closing mechanism of the present embodiment.

A structure of the lid opening and closing mechanism 200 will be described below with reference to FIG. 2. The lid opening and closing mechanism 200 includes an outer lid 210, an inner lid 230, a holding member 233, the front case 190, and a screw 234.

The outer lid 210 can be formed of an elastic member. The outer lid 210 includes a door 212 and a hinge 211. The outer lid 210 is opened and closed when the hinge 211 is bended and unbended.

The hinge 211 is formed to extend from a front end of the door 212 toward the front direction, in a direction substantially the same as a direction along a right surface of the door 212. Namely, the outer lid 210 is formed so that the door 212 and the hinge 211 are aligned substantially linearly when seen from the up direction.

An opening 213 is provided in the hinge 211, and a case projection portion 191 is provided in the front case 190. The hinge 211 is sandwiched between the front case 190 and the holding member 233, and is held by the front case 190 and the holding member 233. In such a state that the hinge 211 is sandwiched between the front case 190 and the holding member 233, the case projection portion 191 penetrates through the opening 213. Since the case projection portion 191 penetrates through the opening 213, movement of the hinge 211 in the up and down direction is restricted. The opening 213 is formed to have a size and a shape that allow the hinge 211 to move in the front and back direction. Therefore, the hinge 211 can move in the back and front direction while the door 212 is opening and closing. When the door 212 is closed, the hinge 211 is positioned at a front end of a movable range of the hinge 211. The hinge 211 moves to the back direction while the door 212 is opening. When the door 212 is opened to be substantially perpendicular to an outside surface of the front case 190, the hinge 211 moves to a back end of the movable range of the hinge 211. In this case, even when force is applied to move the hinge 211 to the further back direction while the hinge 211 is at the back end of the movable range of the hinge 211, the outer lid 210 is not removed from the casing since the case projection portion 191 is engaged with a front frame of the hinge 211 because the case projection portion 191 penetrates through the opening 213.

Figure 3:
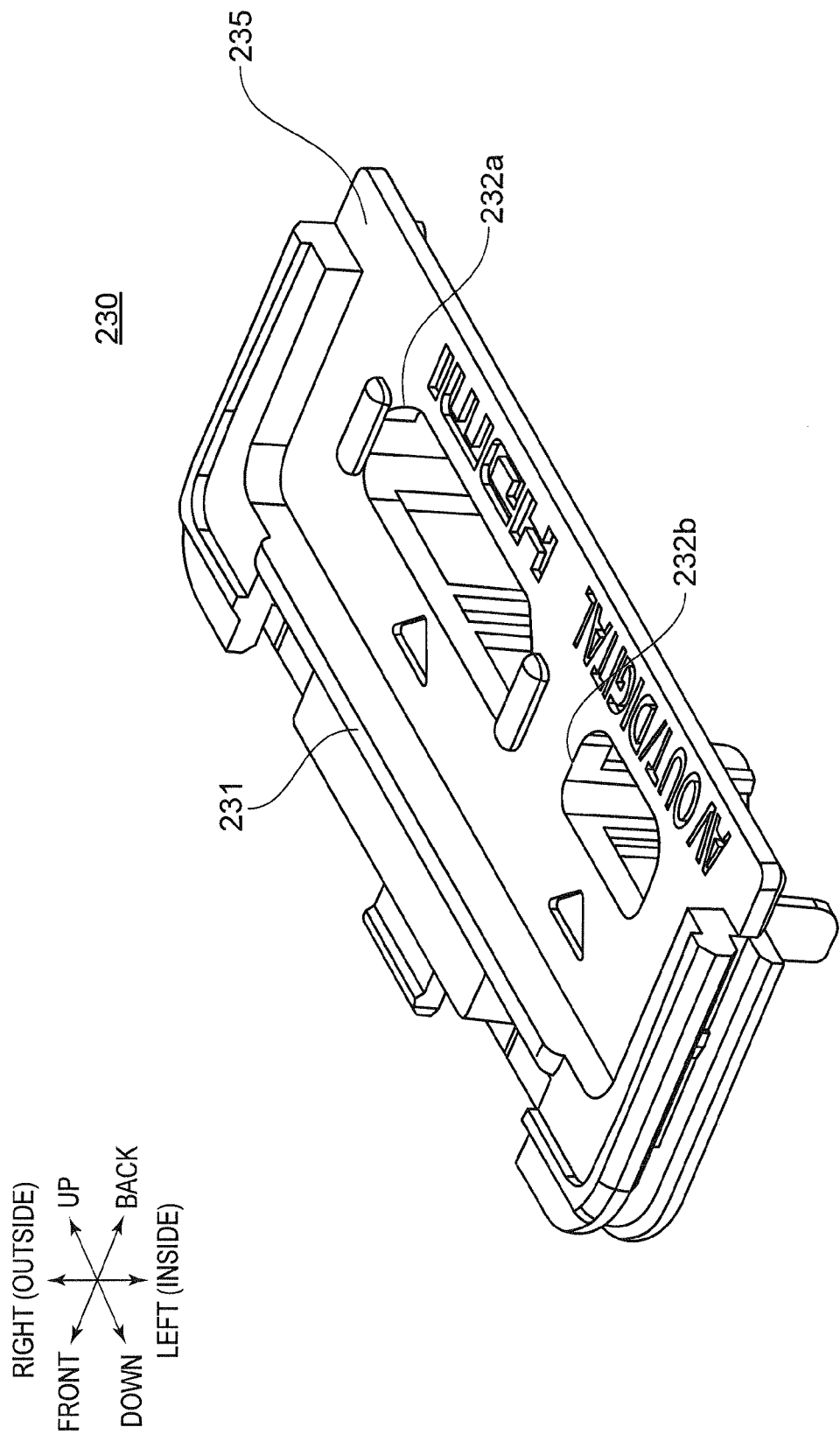
FIG. 3 is a view showing a structure of an inner lid of the present embodiment.

With reference to FIG. 3, a structure of the inner lid 230 will be described. The inner lid 230 has a main surface 235. Openings 232a and 232b are formed on the main surface 235 so that external terminals of the digital camera can be connected to an external apparatus via cables passing through the openings 232a and 232b. The inner lid 230 also has a projection portion 231. As shown in FIG. 3, the projection portion 231 is formed in a rib shape on the inner lid 230. The projection portion 231 is formed to protrude in a normal direction of the main surface 235. In addition, the projection portion 231 is formed so that width in the up and down direction of the projection portion 231 is substantially the same as width in the up and down direction of the hinge 211 when the inner lid 230 and the outer lid 210 are attached to the casing.

Figure 4:
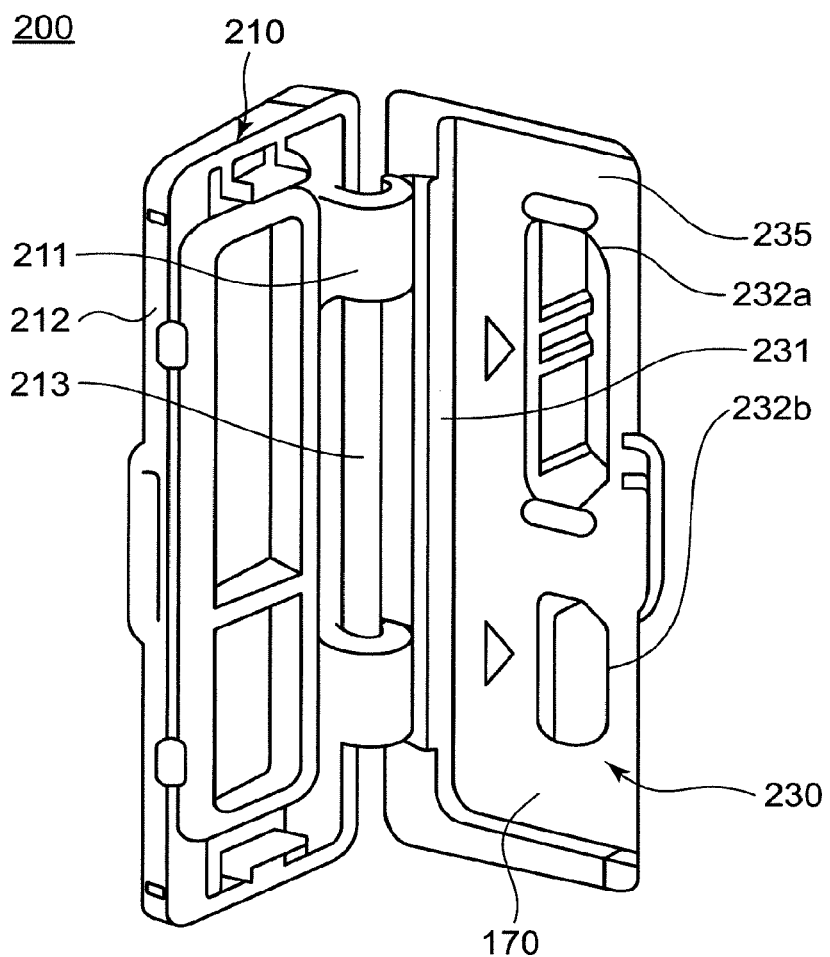
FIG. 4 is an outer appearance view of the lid opening and closing mechanism of the present embodiment.

FIG. 4 shows an outer appearance of the lid opening and closing mechanism 200 when the outer lid 210 and the inner lid 230 are attached to the casing. When the door 212 is opened, the openings 232a and 232b are exposed. When the openings 232a and 232b are exposed, the cables and the like for connecting the digital camera 100 to an external apparatus can be connected to the external terminals. When the external terminals are not used, the door 212 is closed, and therefore, it is possible to prevent dust, water, and the like from entering into the external terminals.

As described above, the hinge 211 is sandwiched between the front case 190 and the holding member 233, thereby allowing the outer lid 210 to be held. The holding member 233 is fixed to the front case 190 with the screw 234. In addition, the inner lid 230 is engaged with and fixed to the holding member 233. Due to this structure, the lid opening and closing mechanism 200 is assembled easily.

The lid opening and closing mechanism 200 is one example of the lid opening and closing mechanism. The digital camera 100 is one example of the electronic apparatus. The outer lid 210 formed of an elastic body is one example of the outer lid. The inner lid 230 is one example of the inner lid.

2. Operation

Operation of the lid opening and closing mechanism 200 will be described below. The lid opening and closing mechanism 200 can be brought into two states of an opened state and a closed state. In the opened state, the door 212 is at an opened position relative to the inner lid 230. In the closed state, the door 212 is at a closed position relative to the inner lid 230.

Figure 5A:
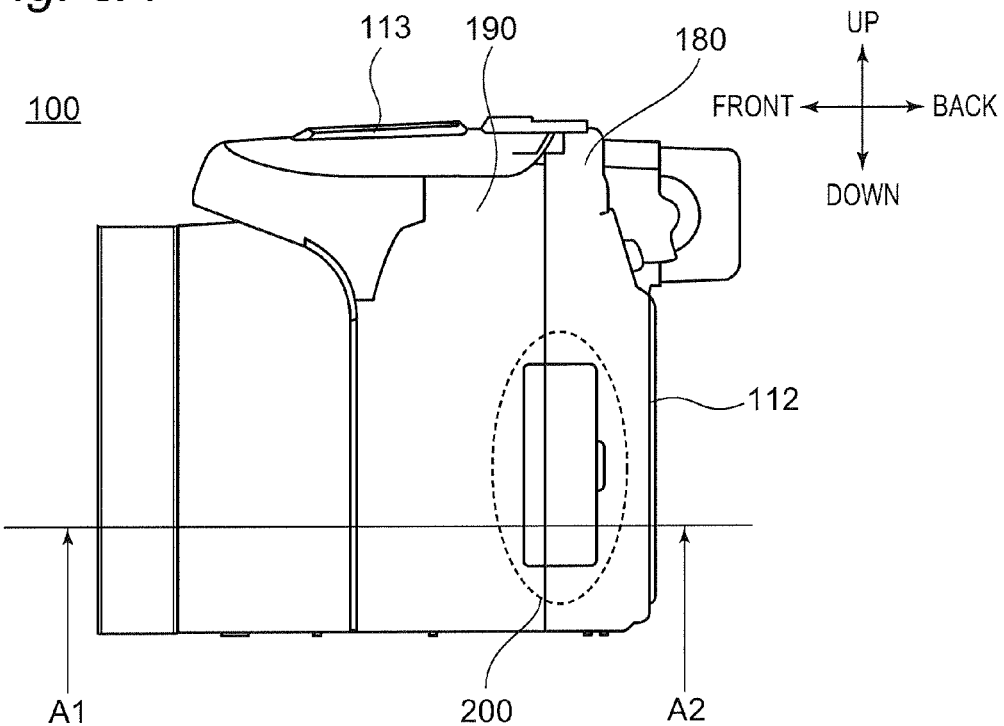
FIG. 5A is an outer appearance view of the digital camera seen from the right side when an outer lid of the present embodiment is in a closed state.
Figure 5B:
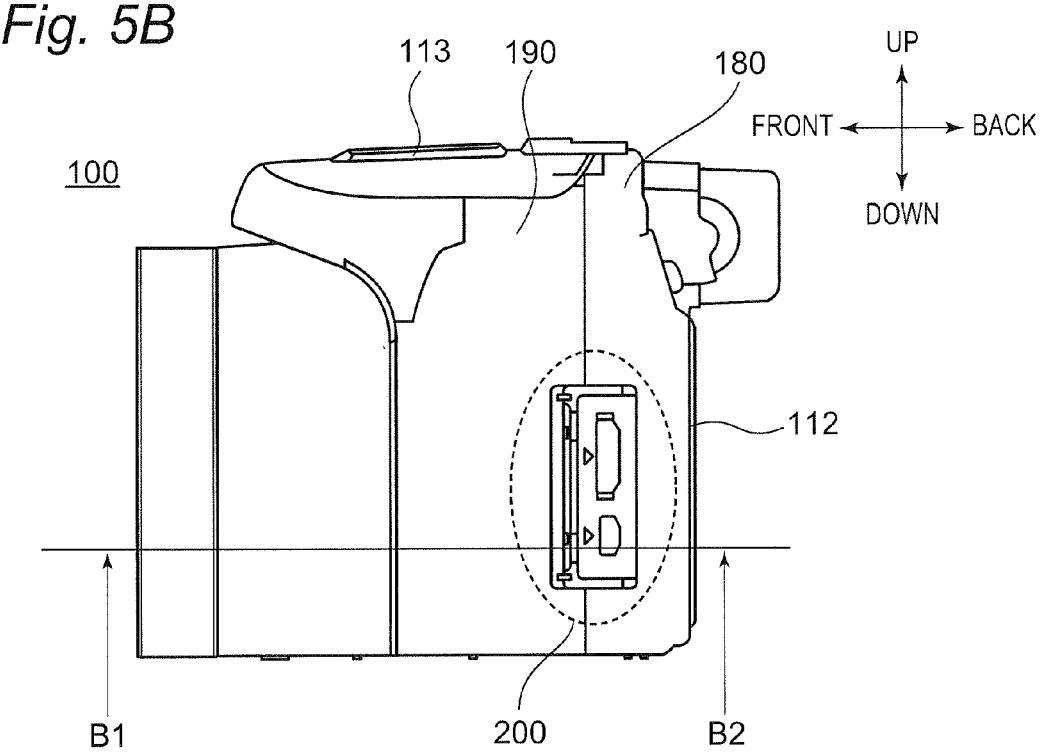
FIG. 5B is an outer appearance view of the digital camera seen from the right side when the outer lid of the present embodiment is in an opened state.
Figure 6A:
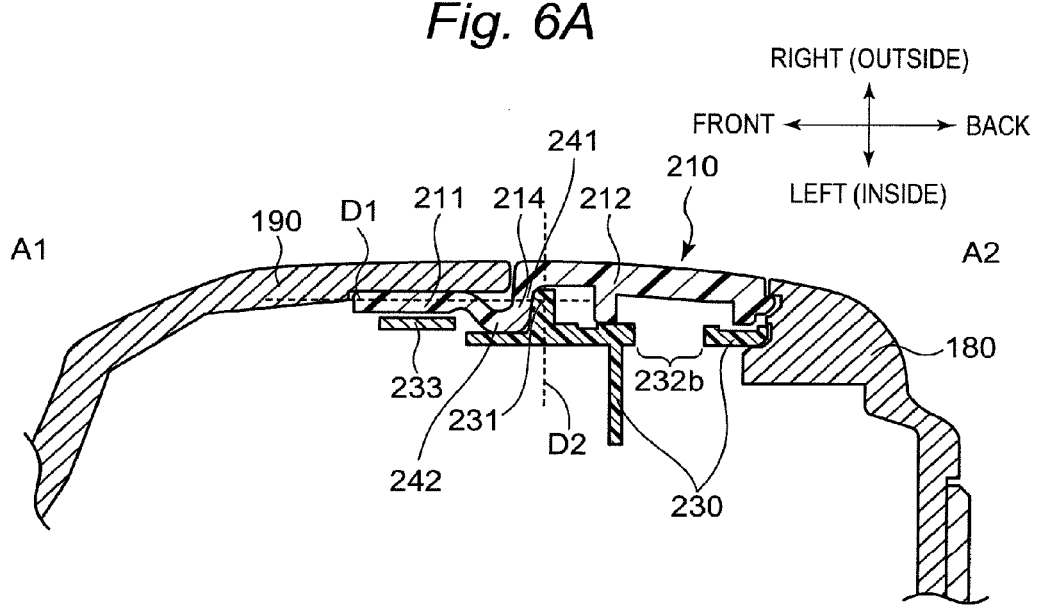
FIG. 6A is a sectional view of the digital camera cut along a line A1-A2 of FIG. 5A.
Figure 6B:
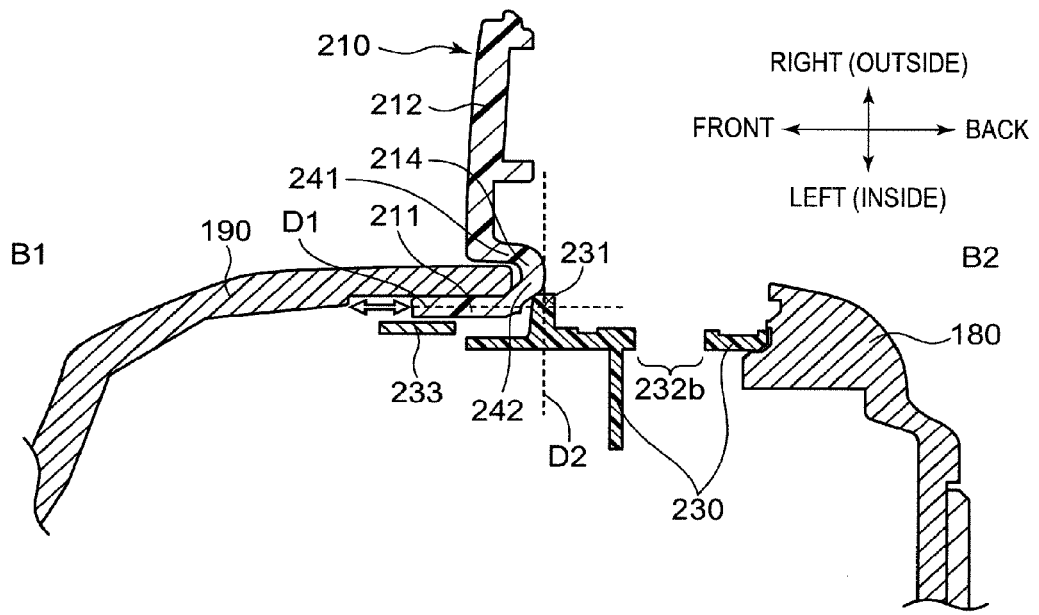
FIG. 6B is a sectional view of the digital camera cut along a line B1-B2 of FIG. 5B.

With reference to FIGS. 5A, 5B, 6A, and 6B, the operation of the lid opening and closing mechanism 200 will be described. FIGS. 5A and 5B are outer appearance views of the digital camera 100 seen from the right side. FIGS. 5A and 6A show the closed state of the lid opening and closing mechanism 200. FIGS. 5B and 6B show the opened state of the lid opening and closing mechanism 200. FIG. 6A is a sectional view of the digital camera 100 cut along a line A1-A2 of FIG. 5A. FIG. 6B is a sectional view of the digital camera 100 cut along a line B1-B2 of FIG. 5B.

As shown in FIG. 6A, when the lid opening and closing mechanism 200 is in the closed state, there is substantially no level difference among outside surfaces of the door 212, the front case 190, and the rear case 180. The hinge 211 is accommodated between the front case 190 and the holding member 233 to be invisible from the outside. In order to realize such a structure, the hinge 211 is provided with a level difference portion 214 having a predetermined size at a border between the hinge 211 and the door 212. In the closed state of the lid opening and closing mechanism 200, the hinge 211 is parallel to the outside surface of the door 212. Namely, the hinge 211 extends from a position, which is inside of the front end of the door 212 by one level, to the front direction of the digital camera 100. In addition, the hinge 211 is once bended in the casing inward direction in the vicinity (a base portion of the hinge 211) of the border between the hinge 211 and the door 212, and then bended in the outward direction to be connected to the front end of the door 212.

In this case, the hinge 211 is movable in a direction indicated by D1 between the front case 190 and the holding member 233. The projection portion 231 is formed on an extension line of the moving direction D1 of the hinge 211. The projection portion 231 is formed on the inner lid 230 to protrude in the casing outward direction along the direction D2 orthogonal to the moving direction D1 of the hinge 211.

When the outer lid 210 is at the position shown in FIG. 6A, the hinge 211 is sandwiched between the front case 190 and the holding member 233 from the casing inward direction and the outward direction, respectively. The door 212 is sandwiched between the front case 190 and the rear case 180 from the front direction and the back direction, respectively. The outer lid 210 is sandwiched from the front, back, left, and right directions as described above, to be held. When the outer lid 210 is held at this position, the door 212 is maintained in the closed state.

When the door 212 is in the closed state, the hinge 211 is positioned in front of the projection portion 231. In addition, the door 212 is positioned on the outer side (the right side) by one level of the hinge 211 due to the level difference portion 214 on the front side of the projection portion 231. Namely, the projection portion 231 exists in a space surrounded by the outer lid 210 and the inner lid 230. Therefore, the projection portion 231 is not pressed to the door 212 and the hinge 211. Therefore, the hinge 211 is not bended by the projection portion 231.

An operation of the lid opening and closing mechanism 200 when shifting from the closed state to the opened state will be described. When a back end of the door 212 is pulled in the casing outward direction and further pulled out in the back direction of the digital camera 100, the hinge 211 is moved to the back direction of the digital camera 100 along the direction D1 as shown in FIG. 6B. When the hinge 211 is moved, the level difference portion 214 in the vicinity of the border (the base portion of the hinge 211) between the hinge 211 and the door 212 abuts against the projection portion 231. When the door 212 is further pulled out, this level difference portion 214 goes onto the projection portion 231. When the level difference portion 214 goes onto the projection portion 231, a part in the vicinity of the level difference portion 214 is bended to a direction to outside the casing (the right side of the digital camera 100) along the direction D2, since movement in the casing inward and outward direction of a part on the front side of the level difference portion 214 is restricted by the front case 190 and the holding member 233. This is because the hinge 211 has elasticity. Namely, the projection portion 231 is provided on the extension line of the direction D1 in which the hinge 211 is pulled out to protrude in the casing outward direction along the direction D2 orthogonal to the direction D1. Therefore, when the hinge 211 is pulled out, the base portion of the hinge 211 is bended, since a part (the level difference portion 214 at the base) of the hinge 211 goes onto the rib-shaped projection portion 231. As shown in FIG. 6B, because the base portion of the hinge 211 is bended, the door 212 connected to the hinge 211 is moved in the casing outward direction, and therefore, the outer lid 210 is maintained in the opened state.

In the present embodiment, the level difference portion 214 at the base of the hinge 211 has a shape bended in the casing inward direction. Therefore, the door 212 can be maintained in a more widely opened state as compared with a case in which a shape of the level difference portion 214 is not bended in the inward direction.

Operation of the lid opening and closing mechanism 200 when shifting from the opened state to the closed state will be described. When the door 212 is pushed in to be brought into contact with the rear case 180, the hinge 211 is moved to the front direction accordingly. When the hinge 211 is moved to the front direction, the state of the hinge 211 is returned from the state in which the level difference portion 214 of the hinge 211 is abutted against the projection portion 231 to the state in which the hinge 211 is sandwiched between the front case 190 and the inner lid 230. Therefore, the outer lid 210 is maintained in the state shown in FIG. 6A again.

As described above, in the lid opening and closing mechanism 200, by moving the hinge 211 to the front and back directions relative to the front case 190, the door 212 can be opened and closed. Concretely speaking, when the door 212 is opened, the hinge 211 is moved to the back direction. The inner lid 230 is provided with the projection portion 231 on the extension line of the moving direction D1 of the hinge 211 to protrude along the direction D2 orthogonal to the extension line. Therefore, the part of the moved hinge 211 goes onto the projection portion 231, and this allows a bended state of the hinge 211 to be maintained. Since the bended state of the hinge 211 is maintained, the door 212 is maintained in the opened state. In addition, since the outer lid 210 is anchored to the case projection portion 191 of the front case 190, the outer lid 210 is not removed from the casing.

3. Conclusion of the Present Embodiment

As described above, the lid opening and closing mechanism 200 of the present embodiment includes the casing 180 and 190 having the opening 170, the inner lid 230 provided in the opening 170, and the outer lid 210 operable to close the opening 170. The outer lid 210 has the door 212 operable to cover the inner lid 230, and the hinge 211 operable to be bended and unbended to open and close the door 212. The inner lid 230 has the projection portion 231 that protrudes from a surface of the inner lid 230. The hinge 211 is arranged movably in the direction from the hinge 211 to the door 212, so that the hinge 211 is accommodated inside the casing 180 and 190 in the closed state of the door 212, and the hinge 211 is pulled out outside the casing 180 and 190 in the opened state of the door 212. The projection portion 231 is formed so that, when the hinge 211 moves while the state of the door 212 changes from the closed state to the opened state, the hinge 211 goes onto the projection portion 231 to be bended by the projection portion 231 to the direction to outside the casing 180 and 190.

According to the present embodiment, the hinge 211 can include first and second bent portions 241 and 242. The first bent portion 241 configured to abut the projection portion 231 while the door is in a closed state as shown in FIG. 6A. The second bent portion 242 is configured to partially rest on the projection portion 231 when the door is in an open state as shown in FIG. 6B. As shown in FIGS. 6A-6B, when the door 212 is shifted between an open and closed state, an end portion of the hinge 211 is movably in a direction (D1) perpendicular to a projecting direction (D2) of the projection portion 231. With this structure, the opened state of the door 212 is maintained more sufficiently, and therefore, a user can access inside of the lid more easily.

4. Other Embodiments

In the above embodiment, the holding member 233 and the inner lid 230 are formed as separate bodies, however, the holding member 233 and the inner lid 230 may be integrated.

In addition, in the above embodiment, the hinge 211 has a shape bended in the casing inward direction in the vicinity (the base of the hinge 211) of the level difference portion 214, however, there may be no portion bended in the casing inward direction at the base of the hinge 211. A level difference is only needed to be provided at the border between the hinge 211 and the door 212 so that the hinge 211 is provided in the inward direction from the door 212. Such a structure is only required so that the hinge 211 is pulled while the door 212 is opened, the pulled-out hinge 211 goes onto the projection portion 231 to be bended on the projection portion 231, so that the door 212 is maintained in the opened state. It is noted that, when there is a portion bended in the inward direction at the base of the hinge 211, there is such an advantageous effect that the door 212 is maintained in the opened state more sufficiently.

In addition, in the above embodiment, the base of the hinge 211 is bended in the casing inward direction, however, the base of the hinge 211 may have other shapes. For example, a convex portion protruding in the casing inward direction may be provided at the base of the hinge 211.

In addition, in the above embodiment, when the door 212 is in the closed state, the projection portion 231 does not press both of the outer lid 210 and the hinge 211, and therefore, the hinge 211 is not bended by the projection portion 231. However, even when the door 212 is in the closed state, the projection portion 231 may press the hinge 211, and therefore, the hinge 211 may be bended. In this case, it is only required that when the door 212 is brought into the opened state, the hinge 211 is more largely bended than the closed state of the door 212, so that the door 212 is maintained in the opened state sufficiently.

In the above embodiment, both of the door 212 and the hinge 211 are made of elastic bodies, however, when the hinge 211 is formed of an elastic body, the door 212 may be formed of a non-elastic body.

Figure 7A:
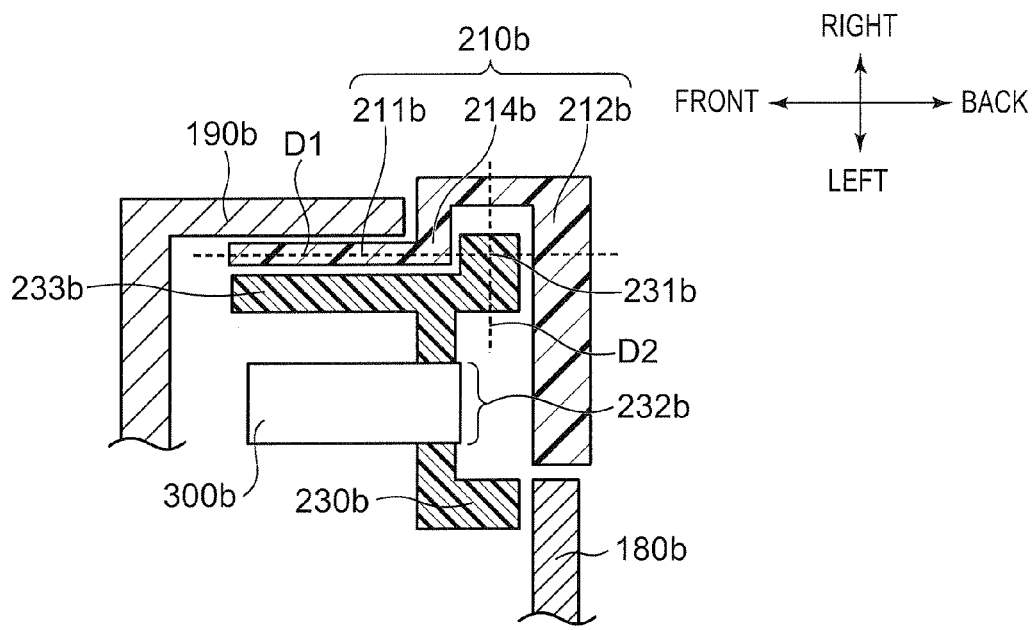
FIG. 7A is a sectional view of a digital camera of another embodiment when an outer lid is in the closed state.
Figure 7B:
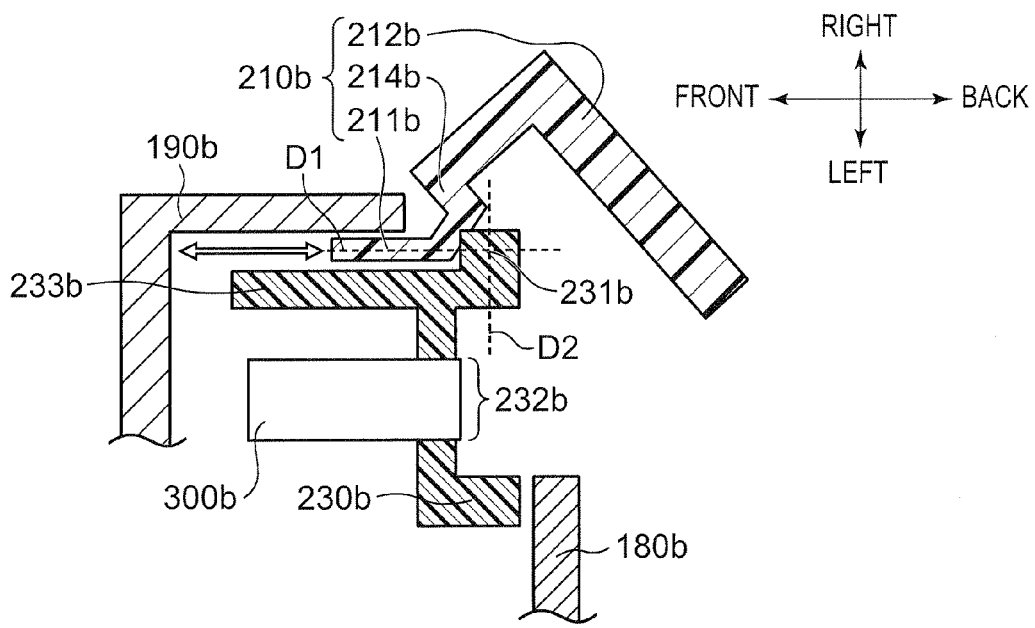
FIG. 7B is a sectional view of the digital camera of another embodiment when the outer lid is in the opened state.

In addition, in the above embodiment, the outside surface of the door 212 is substantially parallel to the moving direction D1 of the hinge 211, and the door 212 is opened to the right side of the digital camera 100 when pulled out to the back side. However, the direction of pulling out the door 212 and the opening and closing direction of the door 212 are not limited to this. For example, as shown in FIGS. 7A and 7B, the present embodiment can be applied even to a case where the lid opening and closing mechanism 200 is placed at a corner of the casing. In the closed state of the door 212b, a hinge 211b is sandwiched between a front case 190b and a holding member 233b, and a door 212b is sandwiched between the front case 190b and a rear case 180b. Therefore, the door 212b is maintained to cover an inner lid 230b. In the above embodiment, the inner lid 230 and the door 212 are provided on a right surface of the casing. However, in the embodiment shown in FIGS. 7A and 7B, the inner lid 230b and the door 212b are provided on a back surface of the casing. The hinge 211b is provided to extend in a direction substantially perpendicular to an outside surface of the door 212b. The hinge 211b is movable along the direction D1. In addition, a projection portion 231b is formed on an extension line of the moving direction D1 of the hinge 211b, and is formed to protrude to the right side of the digital camera 100 along the direction D2 orthogonal to the moving direction D1 of the hinge 211b. When the door 212b is pulled out to the back side along the direction D1, the hinge 211b goes onto the projection portion 231b and is bended in the right direction. When the hinge 211b is bended in the right direction, the door 212b is maintained in the opened state to the back side. As described above, even in the structure in which the hinge 211b is provided in the perpendicular direction to the door 212b, the opened and closed states of the door 212b are maintained, respectively. It should be noted that in the embodiment shown in FIGS. 7A and 7B, the inner lid 230b and the holding member 233b are integrated.

In addition, in the above embodiment, the lid opening and closing mechanism is provided in the casing of the digital camera. However, the lid opening and closing mechanism of the present embodiment may be applied to electronic apparatuses other than the digital camera. The lid opening and closing mechanism of the present embodiment can be applied to electronic apparatuses such as a cellular phone and a mobile terminal, for example.

In the above embodiment, the front case and the inner lid are formed as separate bodies. However, the front case and the inner lid may be integrated.

In addition, in the above embodiment, the projection portion of the inner lid is formed in a rib shape so that the width of the projection portion is the same as the width of the hinge of the outer lid. However, the shape of the projection portion may be appropriately determined depending on a shape of the hinge. The projection portion only needs to protrude at least a part of the inner lid where the hinge is abutted with the inner lid.

The thought of the above embodiment can be utilized for electronic apparatuses each provided with a hinged-door type lid.

Although the embodiment has been fully described in connection with the preferred embodiments thereof with reference to the accompanying drawings, it is to be noted that various changes and modifications are apparent to those skilled in the art. Such changes and modifications are to be understood as included within the scope of the embodiment as defined by the appended claims unless they depart therefrom.

What is claimed is:

1. An electronic apparatus comprising:
   a casing having an opening provided on an outer surface of the casing and
   an outer lid operable to close the opening; and
   a lid opening and closing mechanism, wherein:
   the lid opening and closing mechanism comprises an inner lid provided inside the opening; and
   the outer lid has:
   a door operable to cover the inner lid; and
   a hinge operable to be bended and unbended to open and close the door,
   the inner lid has a projection portion that protrudes from a surface of the inner lid,
   the hinge includes first and second bent portions, the first bent portion configured to abut the projection portion while the door is in a closed state, the second bent portion configured to partially rest on the projection portion when the door is in an open state,
   when the door is shifted between an open and closed state, an end portion of the hinge is movably in a direction perpendicular to a projecting direction of the projection portion.

2. The electronic apparatus according to claim 1, wherein the projection portion is provided on an extension line of a movable direction of the hinge.

3. The electronic apparatus according to claim 2, wherein the projection portion is formed to protrude in a direction which is orthogonal to the movable direction of the hinge and is directed to outside of the casing.

4. The electronic apparatus according to claim 1, wherein the casing and the inner lid are formed as separate bodies.

5. The electronic apparatus according to claim 1, wherein the casing and the inner lid are integrated.

6. The electronic apparatus according to claim 1, wherein the hinge is formed of an elastic member.

* * * * *